Nov. 7, 1961   R. Y. SCAPPLE ET AL   3,008,104
HIGH TEMPERATURE FLEXIBLE HOLLOW TUBE WAVEGUIDE
Filed Oct. 1, 1957                              2 Sheets-Sheet 1
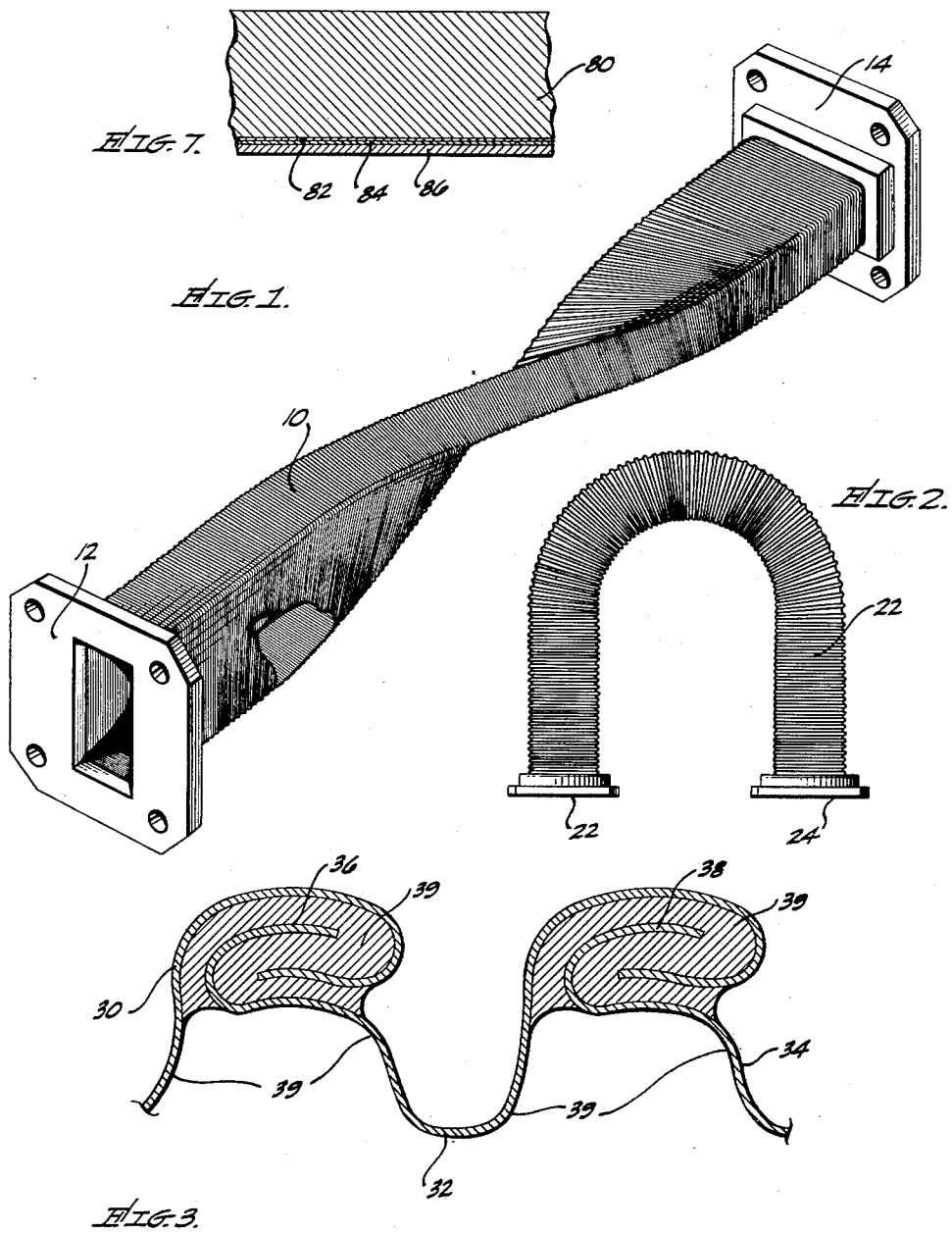
INVENTORS.
ROBERT Y. SCAPPLE,
JEROME I. STILLMAN,
BY
AGENT.

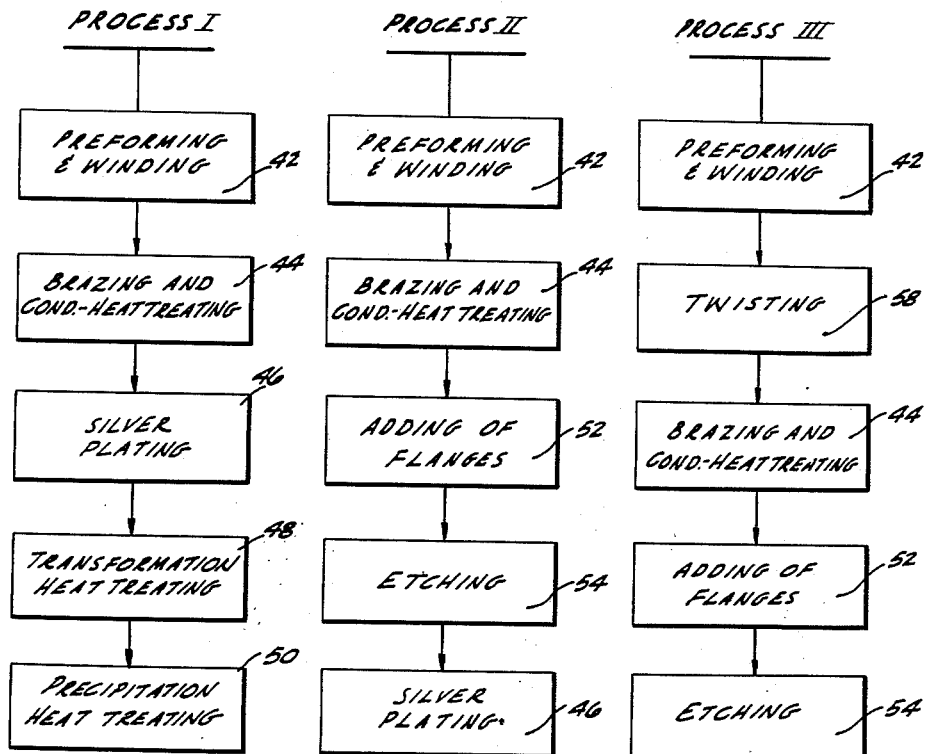
FIG. 6.
FIG. 4.
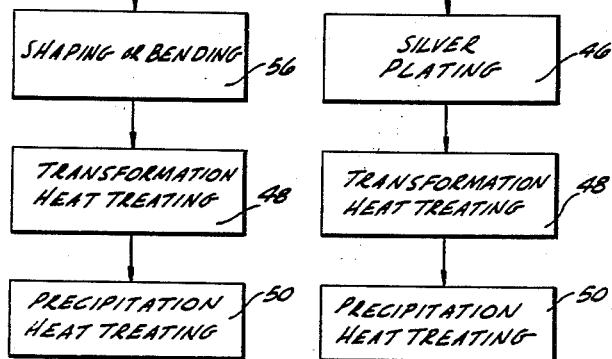
FIG. 5.
INVENTORS.
ROBERT Y. SCAPPLE,
JEROME I. STILLMAN,
BY
AGENT.

United States Patent Office 3,008,104
Patented Nov. 7, 1961

3,008,104
HIGH TEMPERATURE FLEXIBLE HOLLOW TUBE WAVEGUIDE
Robert Y. Scapple and Jerome I. Stillman, Los Angeles, Calif., assignors to Hughes Aircraft Company, Culver City, Calif., a corporation of Delaware
Filed Oct. 1, 1957, Ser. No. 687,566
1 Claim. (Cl. 333—95)

This invention relates to flexible waveguides and particularly to flexible hollow waveguides capable of withstanding high temperatures without loss of electrical or mechanical properties, and to processes for manufacturing the same.

Flexible waveguides today form a necessary and integral part of many electronic systems. In radar systems, for example, they may be contained within or mounted upon mechanized equipment such as aircraft, tanks, ships, and other vehicles. Flexible waveguides may be utilized in such applications to couple separately shock mounted subsystems to one another or to provide the feed waveguide means from a transceiver to an antenna having a limited degree of motion in order to provide search.

It has been found that the heat generated in a high speed aircraft may raise the temperature of compartments which ordinarily house the radar equipment to values above 500° Fahrenheit. In order for these aircraft to maintain their high speeds and high performance, it is desirable to eliminate, if possible, the necessity for equipment for cooling the radar system.

Flexible waveguides heretofore available, however, will not operate at elevated temperatures unless cooled. Most prior art flexible waveguides consist of a formed copper-alloy strip with soft soldered convolutions and a synthetic rubber jacket. At temperatures above 500° Fahrenheit the mechanical strength of the copper-alloy usually decreases, the soft solder in the convolutions melts, and the rubber jacket decomposes.

It is therefore an object of this invention to provide a flexible waveguide which will operate satisfactorily above 500° Fahrenheit without need for cooling.

It is another object of this invention to provide a process of manufacturing flexible waveguides which will retain their electrical and mechanical properties up to temperatures of 800° Fahrenheit.

It is a further object of this invention to provide a new process of manufacture for flexible hollow waveguides having superior mechanical and electrical properties.

It is a still further object of this invention to provide a new and improved high temperature waveguide and a method of manufacturing the same.

In accordance with this invention, a stainless steel strip may be utilized to provide a convoluted metal tube of rectangular or any other desirable cross section. Adjacent edges of the convolutions are interlocked, and mechanically and electrically joined by a silver brazing alloy. The silver brazing alloy in addition flows easily and is spread in a thin film on the remaining surfaces of the strip to provide a continuous, adherent, high-conductivity electrical structure. Preferably, the inner surface of the convoluted tubing is additionally silver plated to further increase the electrical characteristics of the flexible waveguide of this invention.

In accordance with other features of this invention, processes are provided for the fabrication of improved flexible waveguides in various forms and of various configurations. A convoluted tube may be obtained by suitably bending a stainless steel strip with interlocking edges. A silver brazing wire is fed into the space between the interlocking edges. Heat is applied to braze the edges and provide a hermetically sealed and electrically conductive tube. Additional heat treatments, plating and bending steps may be performed to provide the process of manufacture of the flexible waveguide.

FIG. 1 is a perspective view of a flexible waveguide in accordance with this invention which includes a permanent 90° axial twist;

FIG. 2 is a perspective view of a flexible waveguide in accordance with this invention which has been deformed into a permanent U shape;

FIG. 3 is an enlarged cross-sectional fragmentary view of adjacent sections of the flexible waveguide, showing the details of interlocking edges which form the convoluted tubing;

FIGS. 4, 5 and 6 are a process flow chart for different processes for manufacturing the flexible waveguide of this invention; and FIG. 7 is an enlarged cross-sectional fragmentary view of part of a single section of the flexible waveguide showing details of the materials deposited on the strip for silver plating.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Referring now to the drawings and particularly to FIG. 1 thereof; there is shown a flexible rectangular hollow waveguide 10 made from stainless steel strip or stripping and provided at its respective ends with separate coupling flanges 12 and 14. By way of illustration, the flexible waveguide 10 is twisted about its longitudinal axis through a 90° angle. Many other configurations of the axial twist type are possible such as a single twist through any given angle or a number of distinct and separate twists following one another in succession. Further, the cross section is, by way of example, shown as rectangular. Many other cross sections such as square or circular are standard waveguide cross sections and may likewise be made in flexible waveguide form in accordance with this invention.

FIG. 2 shows a flexible waveguide 20 likewise manufactured from stainless steel stripping which, instead of being twisted axially, is bent about a broad wall of the guide to assume a U-shape. Coupling flanges 22 and 24 at respective ends of the waveguide 20 provide a convenient coupling means for intercoupling the waveguide 20 with other waveguide components, not shown. The permanent U-shape of the waveguide 20 is shown merely by way of example and demonstrates one of many possible configurations obtainable by bending or shaping the flexible waveguide about one of its walls during its process of manufacture. Further, the waveguide is shown only by way of example, to be of rectangular cross section. Other cross section configurations may be substituted.

FIG. 3 shows a fragment of the waveguide of FIGS. 1 and 2 in order to make clear the relationship of the various segments of the waveguide. The view of FIG. 3 is of a transverse section of the continuous stainless steel strip which goes to make up the principal portion of the waveguide. The individual adjacent sections 30, 32, 34 (as viewed from left to right in the figure), comprise portions of adjacent turns of the strip. Each section 30, 32 or 34 is of similar cross-sectional configuration. As may be seen from the central section 32 each has a positive interlocking edge 36 and a negative interlocking edge 38. Each of these edges 36, 38 mates with the corresponding oppositely curved edge of the adjacent section 30 or 34 of the strip. The thus interlocked edges define a seam which extends along the entire length of the waveguide. The interlocking edges are electrically and mechanically joined by a silver brazing material 39. In addition, in accordance with the process described in detail below, a thin coating of the silver brazing material covers the remainder of the surfaces of the strip. The silver brazing material 39 contains lithium to facilitate the alloying or wetting during the brazing step. The lithium contained in the brazing alloy provides the wetting action normally supplied by the use of a brazing flux. The elimination of the brazing flux is desirable because of the probability of flux entrapment in the convolutions resulting in subsequent corrosion.

Referring now to the process flow charts of FIGS. 4, 5 and 6 and particularly to Process I (FIG. 4) for the manufacturing of stainless steel flexible waveguides in accordance with this invention, each step is indicated by a box designated with a reference numeral identifying that step. Like reference numerals designate like steps. Process I is a general process in accordance with this invention and will produce a substantially straight flexible waveguide from stainless steel stripping. Process II and Process III shown in FIGS. 5 and 6 respectively, are also processes in accordance with the invention which provide deformation, by bending or axial twisting, of the waveguide being fabricated.

The initial operation in Process I as well as in Processes II and III is a preforming and winding step 42. A stainless steel strip which may be about 0.2" wide and about 0.003" thick is inserted into one of several well known machines for providing convoluted hollow tubing for flexible waveguides. This machine preforms the stainless steel strip by bending the edges to form the oppositely curved edges 36, 38 shown and described in FIG. 3. A wire of a silver brazing material containing lithium is inserted into the seam between the convolutions during the manufacture of the convoluted tubing. A preferred stainless steel for the stripping is manufactured by the Armco Steel Corporation under the trade designation 17-7 PH. This material is especially suitable because it has excellent forming properties, it can be heat treated to achieve high mechanical properties, it possesses good corrosion resistance and the heat treatment and brazing temperatures are compatible. Other stainless steel alloys which may be used include 17-4 PH, and 17-10 P, Armco Steel Corporation; AM350, Allegheny Ludlum Steel Corporation; Stainless W., United States Steel Corporation; and a family of commercial stainless steel alloys designated as the AISI 300 series.

A preferred brazing material is a 92% silver, 8% copper brazing alloy containing 0.2% lithium which is manufactured by Handy and Harmon under the trade designation Sterling+Li. This alloy is particularly advantageous because it can be used without a brazing flux and its brazing temperature is compatible with the heat treating temperature of the stainless steel. A number of other silver brazing alloys may be used, such as those known in the trade as BT+Li, BT, and 85 Ag-15 Mn, Handy and Harmon.

The second step 44 in Process I of FIG. 4 is referred to as the brazing and condition heat treating step in the manufacture of the flexible waveguide of this invention and is serving a two-fold purpose. First, the brazing material 39 (of FIG. 3) is heated to a temperature to braze the interlocking edges 36 and 38 of FIG. 3 to one another and thereby provide a hermetically sealed and electrically joined waveguide. The brazing alloy also flows easily and thereby deposits a thin film of silver over the portion of the strip lying between seams and thereby improves the electrical characteristics of the waveguide. In fact the whole surface of the convoluted hollow tube is coated by this step with a thin layer of silver. Second, the same temperature is used to heat the stainless steel convoluted tube to provide the initial heat treatment of the stainless steel. This initial heat treatment is usually referred to as the conditioning heat treatment and is the first of three successive heat treatments. The function of the conditioning heat treatment is to produce an austenitic matrix which will have a suitable martensitic transformation temperature.

For the materials heretofore designated, the brazing and conditioning heat treating step 44 may be accomplished by heating the flexible waveguide to a temperature within the range of 1,750° to 1,800° Fahrenheit in an atmosphere of dry hydrogen having a dew point of −50° Fahrenheit or lower.

The third step 46 of Process I is referred to as silver plating step 46 and further improves the electrical characteristics of the flexible waveguide of this invention. As is well known to those skilled in the art, stainless steel cannot usually be directly silver plated. The silver plating step 46 therefore involves three separate operations. First, the flexible waveguide is given a nickel strike followed by a copper strike and then silver plated by methods well known to those skilled in the art. The term "strike" refers to forming a preliminary deposit, as thin as possible without being discontinuous, at a rapid rate preliminary to a longer and slower deposit. A nickel strike solution which may be used in connection with this invention is known to those skilled in the art as Wood's Nickel. The copper strike is deposited on the nickel to provide a suitable base for the silver plate. A silver plate thickness of .0005" has been found to provide adequate electrical properties.

FIG. 7 shows an enlarged portion of the strip 80 which is coated first with a very thin layer of nickel 82 and thereafter with a very thin layer of copper 84. A layer of silver plate 86 is then deposited upon the copper.

The attenuation of an unplated waveguide, that is a waveguide coated in the brazing step 44, measured at a frequency of 9,000 megacycles per second was found to be approximately 0.50 decibels per foot. After silver plating, the attenuation of the same waveguide was measured to be 0.08 decibel per foot. Some applications utilizing flexible waveguides will permit a slightly imperfact wave propagation component. In such applications, the plating step 46 may be omitted altogether.

The fourth step 48 of Process I of FIG. 4 is referred to as the transformation heat treating step 48 and provides the second heat treatment of the stainless steel stripping. The function of the transformation heat treatment is to transform the relatively soft austenite to a stronger martensite. This heat treating step 48 may be accomplished by either an eight hour exposure at −100° Fahrenheit or a one hour exposure at 1,400° Fahrenheit in an inert non-oxidizing atmosphere. A cold treatment is preferred because it eliminates the need for an inert non-oxidized atmosphere furnace and it prevents damage to the adhesion and other characteristics of the electrodeposited coatings.

The fifth step 50 in Process I is referred to as the precipitation heat treating step 50 and is the final heat treatment of the stainless steel waveguide. The function of the precipitation heat treatment is to further strengthen the martensitic structure by means of a complex precipitation mechanism. It may be accomplished by exposing the waveguide to a temperature of 950° to 1,050° Fahrenheit for a period between ½ hour and ⅜ hours. This step achieves the ultimate mechanical properties inherent in the stainless steel.

Referring now to Process II of FIG. 5, the preforming and winding step 42 and the brazing and condition heat treating step 44 provide the first two steps and have been fully described previously in connection with Process I of FIG. 4. The third step 52 of Process II is referred to as adding of flanges -step 52 and is included in the description of the process of this invention to point out with particularity at what stage the flanges are brazed to the waveguide. In order not to soften the brazing material 39 of FIG. 3 within the seams, the flanges are brazed to the waveguide at a temperature below 1,750° Fahrenheit. The brazing material used is therefore chosen so that it flows below a temperature employed for step 44 and above the temperature employed in later steps 48 and 50.

The fourth step 54 in Process II is referred to as etching step 54 and contemplates the exposure of the waveguide to an acid bath or pickle bath to remove the surface oxidation formed during the step 52 of brazing the flanges to the convoluted tube. The surface oxidation may be removed by a number of different etching methods, one of which is an immersion for about 5 minutes in a solution of 10% nitric acid, 2% hydrofluoric acid and water maintained at a temperature of 110° to 140° Fahrenheit. This step 54 is the fifth step in Process II and prepares the flexible waveguide for the silver plating step 46 described in detail above in connection with Process I.

After the waveguide is silver plated (step 46), the waveguide is subjected to the sixth step 56 is Process II of FIG. 5 referred to as the shaping or bending step 56. The waveguide is bent to the desired shape and held in this shape by means of a fixture or other devices well known to those skilled in the art. The seventh and eighth steps 48 and 50 are respectively, the transformation heat treating step and the precipitation heat treating step, and have been described in detail in connection with Process I of FIG. 4. These steps make the deformation permanent and provide the final heat treatments to the flexible waveguide of this invention. FIG. 2 is an example of a bent waveguide to which a permanent U-shaped bend has been imparted.

Referring now to Process III of FIG. 6, the first step 42 is the preforming and winding step 42 which has been fully described previously in connection with Process I of FIG. 4. The second step 58 in Process III is referred to as the twisting step 58. The waveguide is axially twisted through the desired angular displacement and held in this shape by means of a fixture or other device well known to those skilled in the art. As indicated above, when an axially twisted waveguide is desired, this deformation is preferably imparted prior to brazing the convoluted seams. The reason for this is obvious, the brazing of the seams makes the convoluted tube too rigid in most instances for imparting the desired twist.

The third step 44 of Process III is the brazing and condition heat treating step 44 which has been fully described previously in connection with Process I of FIG. 4. In Process III, the brazing and condition heat treating step 44 now serves the additional function of making the axial twist to which the convoluted tube has been subjected, a permanent deformation.

The fourth, fifth, sixth, seventh and eighth steps in Process III of FIG. 6 are respectively the adding of flanges step 52, the etching step 54, the silver plating step 46, the transformation heat treating step 48, and the precipitation heat treating step 50. Each of these steps have been described in detail previously in connection with either Process I of FIG. 4 or Process II of FIG. 5. FIG. 1 is an example of a twisted waveguide to which a permanent axial twist has been imparted.

As will be obvious to those skilled in the art, it is possible to impart both axial twists and bends to the flexible waveguide of this invention by making use of a combination of Process II and Process III. This is accomplished by starting with step 42 to obtain the convoluted tubing. The tube is then twisted in accordance with step 58, brazed in accordance with step 44, making the twist permanent. Flanges are added and the waveguide is etched and silver plated according to steps 52, 44 and 46. Thereafter, the twisted waveguide may be shaped or bent in accordance with step 56 and such deformation made permanent by subjecting the flexible waveguide to the final heat treatments in accordance with steps 48 and 50.

There has been described hereabove a new flexible waveguide and a new process of manufacturing the same. The flexible waveguide of this invention comprises a stainless steel convoluted tube with brazed seams which is able to withstand temperatures above 500° Fahrenheit. The process of manufacturing the flexible waveguide of this invention includes a preforming and winding step which is followed by several heat treatment steps. Other steps in the process are included to increase the electrical characteristics of the waveguide such as the silver plating step and to provide waveguides having a desired geometrical configuration such as the bends or twists. As will be obvious to those skilled in the art, a large number of variations are possible and lie within the scope of this invention.

We claim:

A high temperature flexible hollow waveguide comprising: an elongated stainless steel strip wound in convolute form, the edges of said strip being bent in opposite directions and the oppositely bent edges of adjacent segments of said strip being interfolded to define a helical seam; and a joiner member of silver brazing material mechanically and electrically connecting the interfolded edges at said seam, a relatively thin film of said brazing material being coated on substantially all the remaining surfaces of said strip.

References Cited in the file of this patent

UNITED STATES PATENTS

| | | |
|---|---|---|
| 2,527,287 | Ziegler et al. | Oct. 24, 1950 |
| 2,545,862 | Scott et al. | Mar. 20, 1951 |
| 2,600,169 | Lamb | June 10, 1952 |
| 2,636,083 | Phillips et al. | Apr. 21, 1953 |

OTHER REFERENCES

Ragan: "Microwave Transmission Circuits" (vol. 9 of Radiation Laboratory Series), McGraw Hill Book Co., New York, 1948.